C. C. MOSHER.
MIXING MACHINE.
APPLICATION FILED MAR. 20, 1920.

1,364,401.

Patented Jan. 4, 1921.
2 SHEETS—SHEET 1.

Inventor
Clifford C. Mosher
By Howard Coombs
Attorney

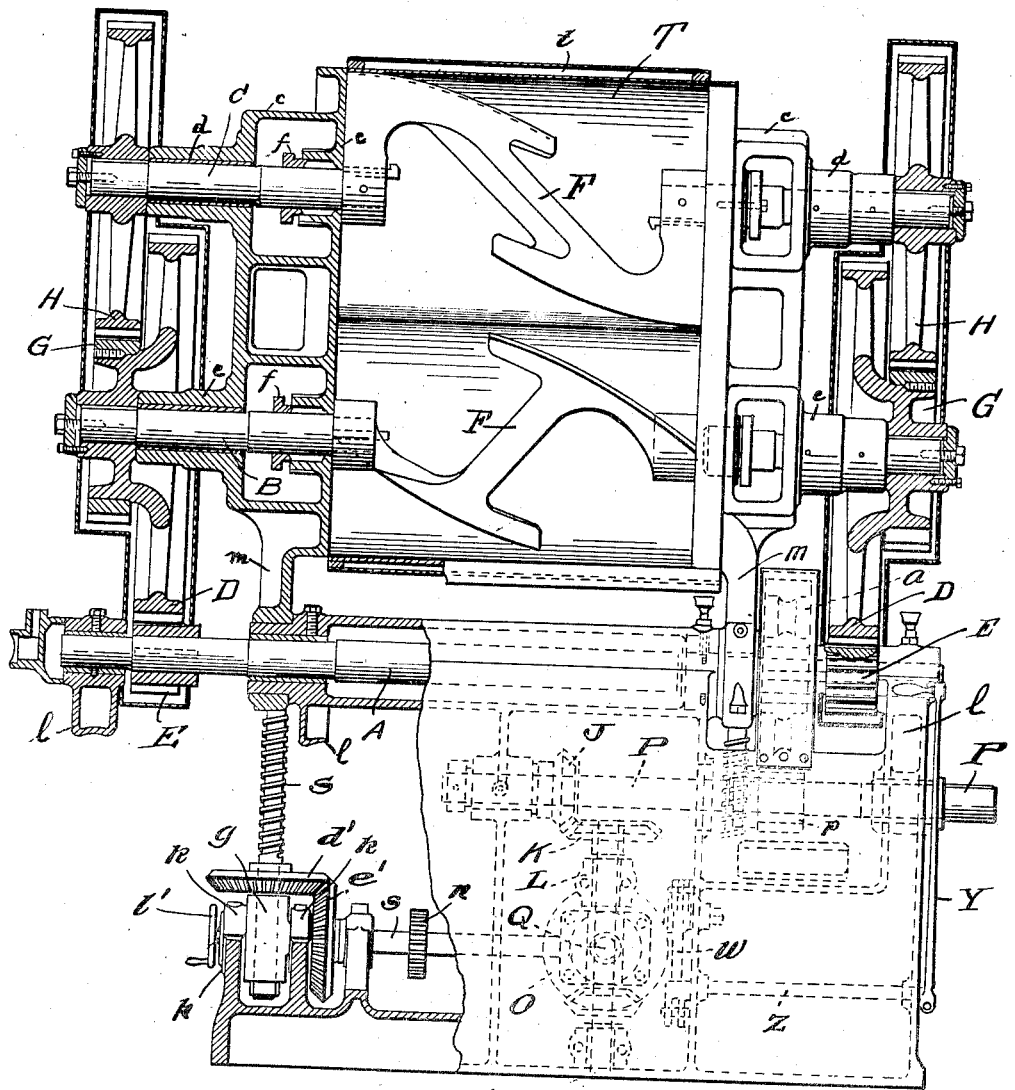

UNITED STATES PATENT OFFICE.

CLIFFORD C. MOSHER, OF LIMA, OHIO.

MIXING-MACHINE.

1,364,401.   Specification of Letters Patent.   Patented Jan. 4, 1921.

Application filed March 20, 1920. Serial No. 367,339.

*To all whom it may concern:*

Be it known that I, CLIFFORD C. MOSHER, a citizen of the United States, residing at Lima, in the county of Allen and State of Ohio, have invented new and useful Improvements in Mixing-Machines, of which the following is a specification.

The present invention relates to mixing machines for any materials of a plastic nature and consists in certain improvements in the construction and mode of operation of such machines.

The machine chosen for illustration as embodying the improvements is more particularly adapted for kneading and mixing macaroni dough but, as the present improvements are independent of the particular kind of mixing blades or agitators used, the novel features are applicable to any form of mixing machine in which the operation is performed in a mixing trough or tub which can be tilted to discharge its contents.

More particularly stated, the present improvements consist in the construction of the trough itself, the way in which it is mounted for tilting, the means by which it is tilted, and in the means by which the agitators are driven.

The features of novelty will hereinafter be specifically set forth in the claim, and the machine will now be described with reference to the accompanying two sheets of drawing, in which—

Fig. 2 is a front sectional view, partly in elevation, of the machine with the trough in its tilted position.

Figure 1:
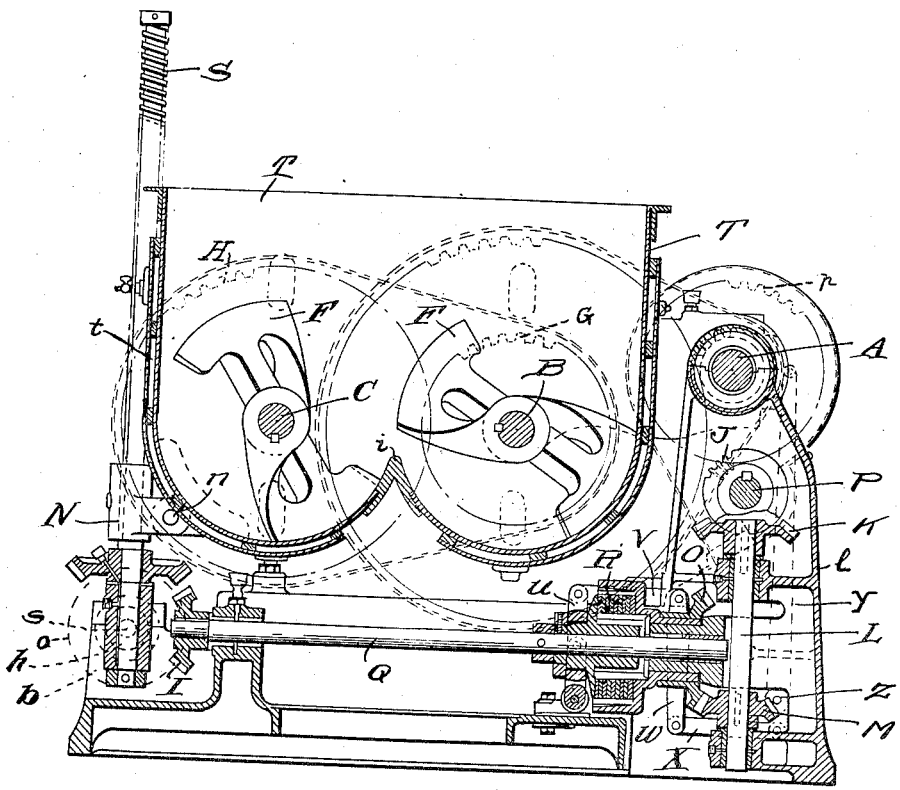
Figure 1 is a sectional side elevation of the machine.

T represents the trough, composed of the cast iron ends $c$, comprising bearings $d$ and $e$ for the agitator shafts B and C, the cast iron saddle $i$, and the sheet metal walls $t$, which are double to form a jacket space for steam or other fluid. Stuffing boxes $f$ are provided in the ends $c$ to prevent the material from leaking out around the shafts B and C.

The trough is pivotally swung upon a hollow frame journal surrounding the shaft A by means of arms or brackets $m$, cast integral with the ends. The shaft A is journaled in standards $l$ of the frame and lies below the top of the trough and at a distance away from its wall, as appears in Fig. 1.

On the shafts B and C are mounted the mixing blades or agitators F, which are here shown of the shape covered by U. S. Patent No. 1,019,976 to Oelman. The power to drive the agitator shafts is applied at both ends through gears G and H on said shafts respectively; the gears H are of greater diameter than gears G so that the two agitators will be driven at different speeds in different directions, whereby a more thorough mixing and kneading action is attained.

The primary power shaft is shown at P, and it drives the shaft A by its pinion $p$ meshing with the gear $a$ on the shaft A. Either the pinion $p$ or the gear $a$ may be loose on its shaft and connectible thereto by any usual form of clutch, so that the agitators need not be driven while the trough is being tilted, but such a clutch is not essential since it is often desirable to run the agitators while the trough is tilted.

The tilting mechanism consists of the vertical screws S, engaging nuts N, pivoted at $n$ to the rear lower portion of the trough ends. These screws are detachably connected to the power shaft P by the following mechanism: A bevel gear J on power shaft P meshes with a like gear K on a vertical shaft L, on the lower end of which is mounted a bevel gear M, in mesh with a like gear O on a fore-and-aft shaft Q and detachably connected to said shaft by a clutch R, the movable member of which is actuated by hand lever Y through the shaft Z and levers and links $u$, $v$, $w$ and X. On the rear end of shaft Q is bevel gear I, which meshes with a like gear $o$ on a shaft $s$, running beneath the rear end of the trough parallel to the power shaft P. On each end of shaft $s$ is a bevel gear $e'$ in mesh with a like gear $d'$ on each of the screws S. Beneath the gear $d'$, each screw is journaled in a sleeve $g$ having trunnions $h$, journaled in bearings $k$ of the frame base, whereby said screws can swing toward and from the pivotal shaft A, as is necessary when they are rotated to tilt the trough. To actuate the screws and tilt or lower the trough by hand when the clutch R is thrown out, shaft $s$ carries a gear $n$, which can be driven from a hand wheel $l'$ through a shaft and pinion, not shown.

The manner of operating this machine will be evident from the above. The trough being supplied with the dough or other material, the agitators are driven in the manner described and, when the mix is complete, the clutch R is thrown in, whereby the screws S are rotated and, through their engagement with the nuts N, gradually tilt the trough about the axis of the shaft A until it is in the vertical position shown in Fig. 2, or slightly beyond the vertical, so as to discharge its contents, the agitators being kept running or stopped, if desired. The clutch R is then thrown out and the trough lowered by the hand means.

Having thus described my invention, what I claim is:

In a mixing machine, the combination with a mixing trough and rotary agitators therein, of a pivot shaft outside the trough, gearing connecting said shaft and said agitators, a power shaft and gearing between it and said pivot shaft, a vertical shaft geared to said power shaft, a shaft running beneath the trough, a clutch to connect said last mentioned shaft to said vertical shaft, a tilting shaft beneath the rear end of the trough geared to said shaft running beneath the trough, tilting screws engaging the rear end of the trough and connected to be driven by and to swing around said tilting shaft, and means to rotate said tilting shaft by hand when said clutch is thrown out.

In testimony whereof I have hereunto set my hand.

CLIFFORD C. MOSHER.